United States Patent [19]
Baron et al.

[11] Patent Number: 5,951,690
[45] Date of Patent: *Sep. 14, 1999

[54] SYNCHRONIZING AN AUDIO-VISUAL STREAM SYNCHRONIZED TO A CLOCK WITH A VIDEO DISPLAY THAT IS SYNCHRONIZED TO A DIFFERENT CLOCK

[75] Inventors: Yehuda Baron, Palo Alto; Jefferson E. Owen, Fremont; Darryn D. McDade, Santa Clara, all of Calif.

[73] Assignee: STMicroelectronics, Inc., Carrollton, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/762,608

[22] Filed: Dec. 9, 1996

[51] Int. Cl.⁶ ........................................................ G06F 1/12
[52] U.S. Cl. ............................................ 713/400; 713/503
[58] Field of Search .................................... 395/551, 552, 395/553, 558; 713/400, 401, 503

[56] References Cited

U.S. PATENT DOCUMENTS

| 5,594,660 | 1/1997 | Sung et al. | 364/514 R |
|---|---|---|---|
| 5,596,420 | 1/1997 | Daum | 386/110 |
| 5,598,352 | 1/1997 | Rosenau et al. | 364/514 A |
| 5,657,091 | 8/1997 | Bertram | 348/559 |
| 5,668,601 | 9/1997 | Okada et al. | 348/423 |
| 5,815,634 | 9/1998 | Daum et al. | 386/96 |

FOREIGN PATENT DOCUMENTS

| 07170490 | 7/1995 | Japan . |
|---|---|---|
| 08186553 | 7/1996 | Japan . |
| 96/19076 | 6/1996 | WIPO . |

OTHER PUBLICATIONS

Jack, Keith, *Video Demystified*: A Handbook for the Digital Engineer, 2d ed., Hightext Publications, San Diego, 1996, Chaps. 10 and 11, pp. 426–600.

Primary Examiner—Dennis M. Butler
Attorney, Agent, or Firm—David V. Carlson; Theodore E. Galanthay; Lisa K. Jorgenson

[57] ABSTRACT

A DVD player that integrates a DVD device into a personal computer is provided. As such, the personal computer is able to output audio-visual works from a DVD CD-ROM. When integrating a DVD device with a personal computer, various problems must be overcome. For example, in a personal computer, the video display is controlled by a graphics controller, and in order to render an audio-visual stream in a personal computer, the audio-visual stream and the graphics controller must be synchronized. The synchronization problem arises because the graphics controller only displays data at the beginning of 33.4 millisecond time intervals. Thus, although the audio portion may be played almost immediately, the video portion may have to wait for up to 33.4 milliseconds before being displayed. In this manner, the audio portion and the video portion become unsynchronized which means that the audio portion plays before the corresponding video portion is displayed. The DVD player solves this problem by synchronizing the start of the audio-visual stream with the graphics controller so that the time at which a video sequence is displayed coincides with one of the graphics controller's 33.4 millisecond time intervals.

28 Claims, 6 Drawing Sheets

SYNCHRONIZING AN AUDIO-VISUAL STREAM SYNCHRONIZED TO A CLOCK WITH A VIDEO DISPLAY THAT IS SYNCHRONIZED TO A DIFFERENT CLOCK

TECHNICAL FIELD

The present invention relates generally to data processing systems and, more particularly, to synchronizing an audio-video stream synchronized to a first clock with a video display synchronized to a different clock.

BACKGROUND OF THE INVENTION

Digital video disk (DVD) devices store audio-visual data in a highly compressed form and play the audio-visual data to a user. These devices have a read only memory (ROM) for storing audio-visual data. The DVD CD-ROM disc is a super-density disc that can hold up to 18 gigabytes of audio, video and other types of data (e.g., menus, sub-pictures, graphics, etc.). As part of the audio-visual data, the DVD devices store video images on the disc so that the images may be later recalled and displayed on a video display. DVD CD-ROM players retrieve and display video images that have been compressed using known video compression techniques, such as the International Standard Organization's (ISO) Motion Picture Expert Group (MPEG) techniques MPEG 1 and MPEG 2.

MPEG 1 is an ISO standard defined in ISO/IEC 11172 that sets forth a standard format for storing and distributing audio and motion video. Some of the features of MPEG 1 include random access, fast forward, and reverse playback. Consequently, MPEG 1 has been used as the basis for video CDs and many video games. The goal of MPEG 1 is playback of digital audio and video using a standard compact disk with a bit rate of 1.416 Mbps, where 1.15 Mbps of this bit rate is designated for video.

MPEG 2 extends MPEG 1 to cover a wider range of applications. MPEG 2 is an ISO standard (ISO/IEC 13818). The primary application originally targeted by MPEG 2 was all-digital transmission of broadcast-quality video at bit rates of 4–9 Mbps. However, MPEG 2 has become useful for many other applications, such as high definition television, and MPEG 2 now supports bit rates of 1.5–60 Mbps.

In addition to playing video images, DVD devices can also read and play compressed audio sequences using known audio decompression techniques (e.g., Dolby AC3, Linear PCM, MPEG 1 or MPEG 2). As such, these systems are especially well-suited for playing audio-visual works, such as movies.

When playing an audio-visual work like a movie, the DVD device reads an audio-visual stream from the DVD CD-ROM and displays the video portion of the stream on a video display and plays the audio portion of the stream on a speaker. To facilitate the playing of the stream, the stream is stored on the CD-ROM with time stamps from a 27 MHz clock to indicate when a particular portion of the stream is to be played. These time stamps from the 27 MHz clock are also used to synchronize the audio and video portion of the stream at play time. Without the time stamps, if the audio and video portion fall out of synchronization, the quality of the performance of the audio-visual work greatly suffers. As a result of the time stamps of the audio-visual stream being generated using a 27 MHz clock, a clock running at 27 MHz is needed at play time by the DVD device to ensure both that portions of the steam are played at the appropriate time and that the audio portion and the video portion of the stream are synchronized. As such, DVD devices have a 27 MHz clock.

It should be noted that audio-visual streams encoded using the AC3 standard, the MPEG 1 standard, and the MPEG 2 standard use a 27 MHz clock for synchronization.

Although DVD devices have been developed, they are typically stand-alone devices and have not been integrated with other systems. However, by integrating the functionality of a DVD device with a personal computer, additional functionality can be provided to a user. It is therefore desirable to integrate a DVD device into an existing system like a personal computer.

SUMMARY OF THE INVENTION

A DVD player that integrates a DVD device into a personal computer is provided. As such, the personal computer is able to output audio-visual works from a DVD CD-ROM. When integrating a DVD device with a personal computer, various problems must be overcome. For example, in a personal computer, the video display is controlled by a graphics controller, and in order to render an audio-visual stream in a personal computer, the audio-visual stream and the graphics controller must be synchronized. That is, the audio and video portion of the audio-visual stream are synchronized using a 27 MHz clock that is separate from the system clock. This 27 MHz clock is used to determine when to play both the video portion and the audio portion so that they are synchronized with respect to each other. At the appropriate time, the audio portion is sent to the sound subsystem, which has its own clock and which plays the audio portion with little delay. Also, at the appropriate time, the video portion is sent to the graphics controller, which utilizes the system clock for timing. The synchronization problem arises because the graphics controller only displays data at the beginning of 33.4 millisecond time intervals. Thus, although the audio portion may be played almost immediately, the video portion may have to wait for up to 33.4 milliseconds before being displayed. In this manner, the audio portion and the video portion become unsynchronized which means that the audio portion plays before the corresponding video portion is displayed. If the audio portion and the video portion are rendered more than 5 milliseconds apart, the lack of synchronicity is perceptible to a user. The DVD player solves this problem by synchronizing the start of the audiovisual stream with the graphics controller so that the time at which a video sequence is displayed coincides with one of the graphics controller's 33.4 millisecond time intervals.

In accordance with a first aspect of the present invention, a method is practiced in an audio-visual rendering device for synchronizing an audio-visual stream with a display device. The audio-visual rendering device has a first clock that synchronizes an audio portion with a video portion of the audio-visual stream and has a second clock that synchronizes the display device with preset time intervals. The method includes receiving the audio-visual stream, where the audio portion and the video portion have an associated play time, synchronizing the audio-visual stream with the display device such that the play time of the video portion coincides with one of the preset time intervals of the display device, and rendering the video portion in synchronization with the preset time interval of the display device.

In accordance with a second aspect of the present invention, an audio-visual rendering device is provided. The audio-visual rendering device comprises a processor, a second clock, a DVD drive, a video subsystem, a sound subsystem, and a memory. The processor has a first clock. The DVD drive generates an audio-visual stream having a play time synchronized to the second clock. The video subsystem displays a video portion of the audio-visual stream at preset time intervals synchronized to the first clock. The sound subsystem plays an audio portion of the audio-visual stream. The memory contains a program that receives the audio-visual stream, that synchronizes the play time of the audio-visual stream so that the play time coincides with one of the preset time intervals of the video system, and that renders the audio-visual stream.

DETAILED DESCRIPTION OF THE INVENTION

Although it is desirable for a personal computer (PC) to be able to output audio-visual works from a DVD CD-ROM, various problems must be overcome to realize this goal. For example, in a PC, the video display is controlled by a graphics controller, and in order to render an audio-visual stream in the PC, the audio-visual stream and the graphics controller must be synchronized. As was discussed above, the audio-visual stream and the graphics controller are not inherently synchronized. The audio and video portion of the audio-visual stream are synchronized using a 27 MHz clock that is different than the system clock. The 27 MHz clock is used to determine when to play both the video portion and the audio portion so that both portions are synchronized with respect to each other. At the appropriate time, the audio portion is sent to the sound subsystem. The sound subsystem has its own clock and plays the audio portion with little delay. Similarly, the video portion is sent to the graphics controller at the appropriate time and output on the video display. The synchronization problem arises because the graphics controller only displays data at the beginning of 33.4 millisecond time intervals. Thus, although the audio portion may be played almost immediately, the video portion may have to wait for up to 33.4 milliseconds before being displayed. The amount of delay depends on the point of the time interval at which the video data is sent to the graphics controller. In this manner, the audio portion and the video portion become unsynchronized, which means that the audio portion plays before the corresponding video portion is displayed. If the audio portion and the video portion are rendered more than 5 milliseconds apart, the lack of synchronicity is perceptible to a user. A preferred embodiment of the present invention solves this problem by synchronizing the start of the audio-visual stream with the graphics controller so that the time at which a video sequence is displayed coincides with one of the graphics controller's 33.4 millisecond time intervals.

Figure 1:
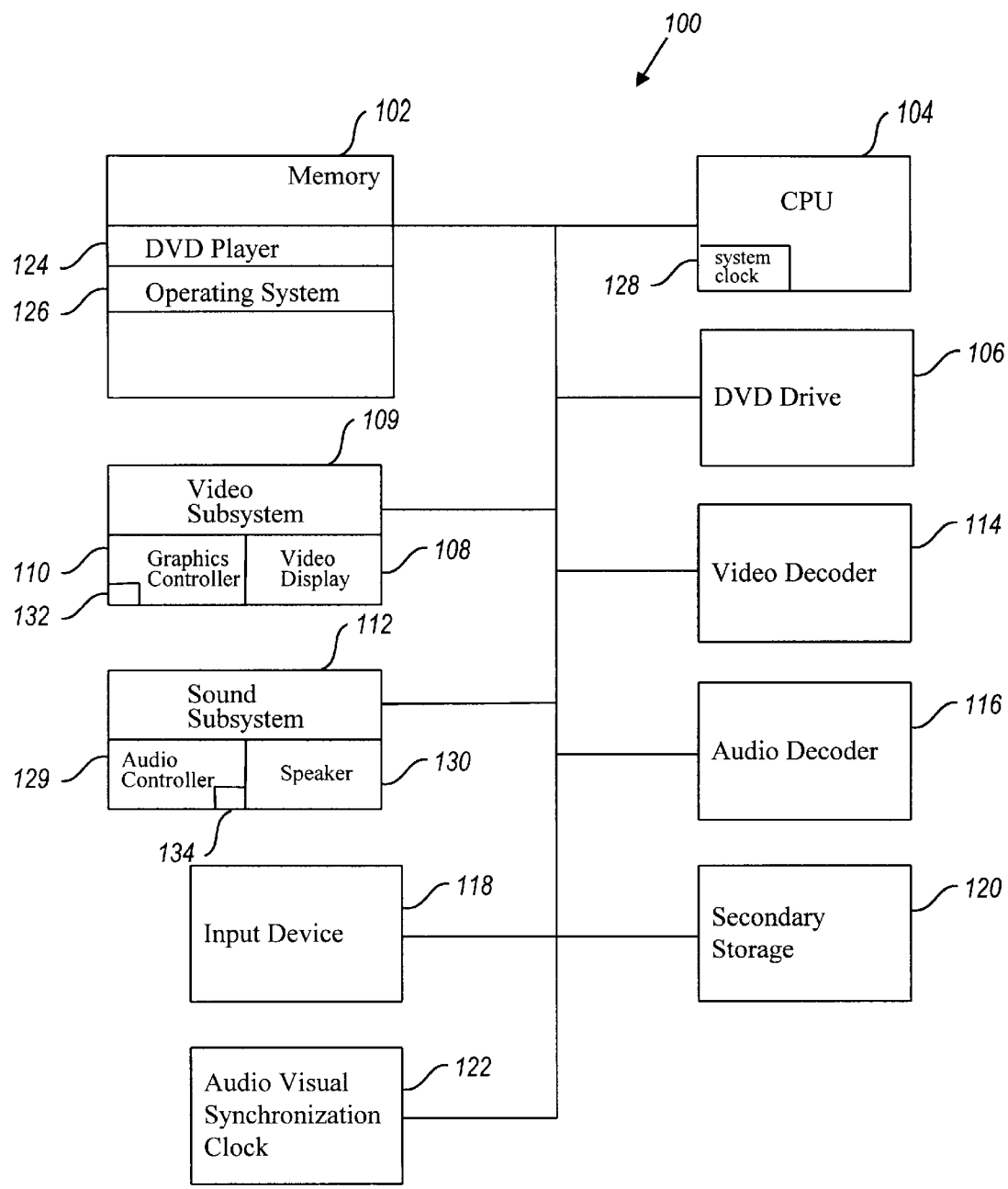
FIG. 1 depicts a computer system that is suitable for practicing a preferred embodiment of the present invention.

FIG. 1 depicts a computer system 100 that is suitable for practicing a preferred embodiment of the present invention. The computer system 100 contains a memory 102; a central processing unit (CPU) 104; a video subsystem 109, including a video display 108 and a graphics controller 110; a sound subsystem 112, including both an audio controller 129 and a speaker 130; a DVD CD-ROM ("DVD drive") 106; a video decoder 114; an audio decoder 116; an input device 118; a secondary storage device 120; and an audio-visual synchronization clock 122. An example of a DVD drive suitable for use in the computer system 100 is the DVD drive available from Panasonic. Corporation of Secaucus, N.J. The memory 102 contains an operating system 126, such as the MICROSOFT® WINDOWS® 95 operating system available from Microsoft Corporation of Redmond, Wash., and a DVD player program 124. The DVD player program 124 is responsible for reading an audio-visual stream from the DVD drive 106, decoding the audio-visual stream using the audio decoder 116 and the video decoder 114, and rendering both the audio and video portions of the audio-visual stream on the sound subsystem 112 and the video display 108, respectively, such that the video portion of the audio-visual stream is synchronized with the graphics controller 110.

The graphics controller 110 controls operations of the video display 108. An example of a graphics controller that is suitable for use in the computer system 100 is the STG 2000 graphics controller available from SGS-Thomson Microelectronics, Inc. of Dallas, Tex. The graphics controller 110 stores video data to be displayed on the video display 108 and instructs the video display to display the stored video data. In order to store the video data, the graphics controller 110 has a limited amount of dynamic random access memory (DRAM) 132. As previously stated, the graphics controller 110 displays data on the video display every 33.4 milliseconds. The data must be stored in the DRAM 132 at the beginning of the 33.4 millisecond time interval; otherwise, the data will not be displayed until the next 33.4 millisecond time interval. The graphics controller 110 utilizes the system clock 128 of the CPU 104 for timing. The system clock 128 runs at the frequency of the CPU 104 (e.g., 133 MHz). At the beginning of each time interval, the graphics controller 110 generates a vsynch signal. The vsynch signal is detectable by application programs and indicates that the beginning of a new time interval and, consequently, that new data will be displayed. The audio controller 129 also has DRAM 134 for storing audio data to be played on the speaker 130.

Both the audio decoder 116 and the video decoder 114 are implemented as hardware circuits using conventional techniques for decoding the audio or video data, like MPEG 1, MPEG 2, or AC3. One skilled in the art will appreciate that the audio decoder 116 and the video decoder 114 may be implemented in software. An example of a video decoder that is suitable for use in the computer system 100 is the STI 3520A video decoder available from SGS-Thomson Microelectronics, Inc. One skilled in the art will recognize that the video decoder 114, although depicted separately from the graphics controller 110, can be implemented as part of the graphics controller. An example of an audio decoder that is suitable for use in the computer system 100 is the STI 4600 audio decoder also available from SGS-Thomson Microelectronics, Inc. The audio-visual synchronization clock 122 is an external clock running at 27 MHz and is used to synchronize the audio-visual stream received from the DVD drive 106. The audio-visual synchronization clock 122 ("the external clock") is a counter which can be initialized to a given value and, after initialization, is incremented at a 27 MHz rate.

As previously stated, the DVD player 124 reads the audio-visual stream from the DVD drive 106 and renders the audio-visual stream using the video subsystem 109 and the sound subsystem 112. The DVD player 124 operates as an application program running on the operating system 120 and utilizes the operating system to access the DVD drive 106. Specifically, the DVD player 124 reads the audiovisual stream by requesting the operating system 126 to open a file on the DVD drive 106 that contains the audio-visual stream and by reading the stream from the DVD drive using normal file system calls of the operating system.

Figure 2:
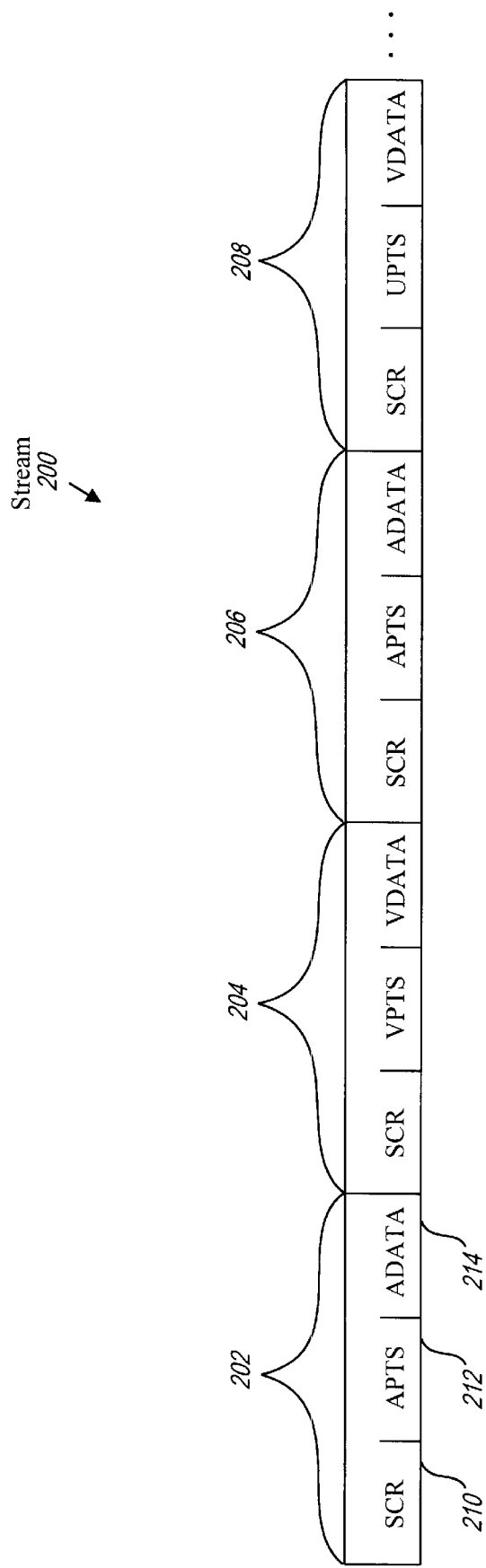
FIG. 2 depicts a format of the audio-visual stream contained on the DVD drive of FIG. 1.

When receiving the audio-visual stream from the DVD drive 106 via the operating system 126, the stream has a format as depicted in FIG. 2. The audio-visual stream 200 comprises a number of frames 202, 204, 206, and 208. One skilled in the art will appreciate that a stream usually has many more frames. Each frame stores either audio data or video data and has a universal system clock reference (SCR) 210, which is a derivative of a 27 MHz time base. All rendering of video and audio data should be performed with respect to the SCR to ensure a proper performance of the audio-visual work. In addition to the SCR 210, each frame has a presentation time stamp (PTS), which is either an APTS for audio or a VPTS for video. This presentation time stamp (e.g., 212) contains a value that, when reached by a clock initialized to the SCR 210 and running at 27 MHz, indicates that the corresponding audio data (ADATA) or video data (VDATA) should be rendered.

Figure 3A:
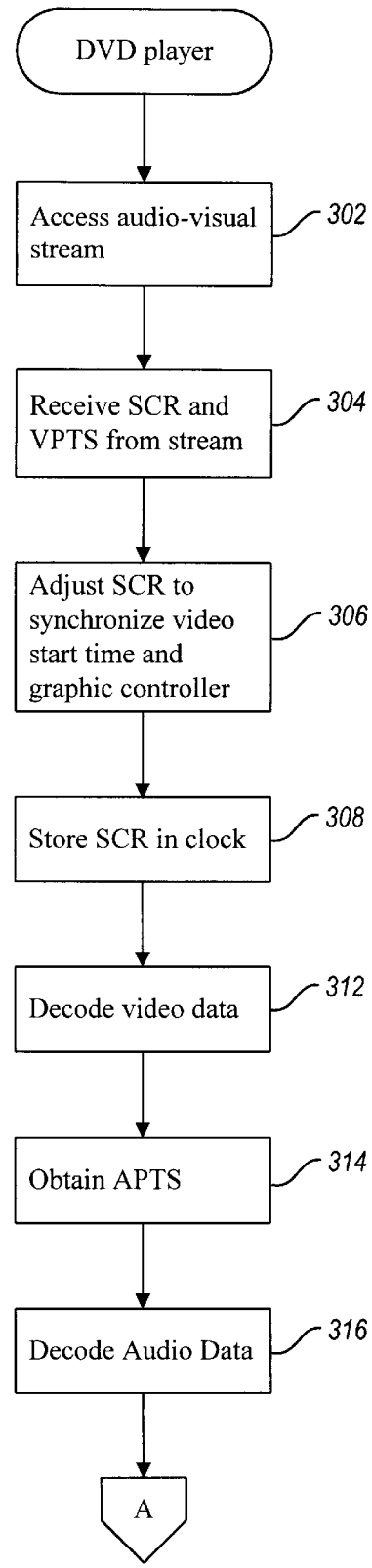
FIGS. 3A, 3B, and 3C depict a flow chart of the steps performed by the DVD player depicted in FIG. 1.
Figure 3B:
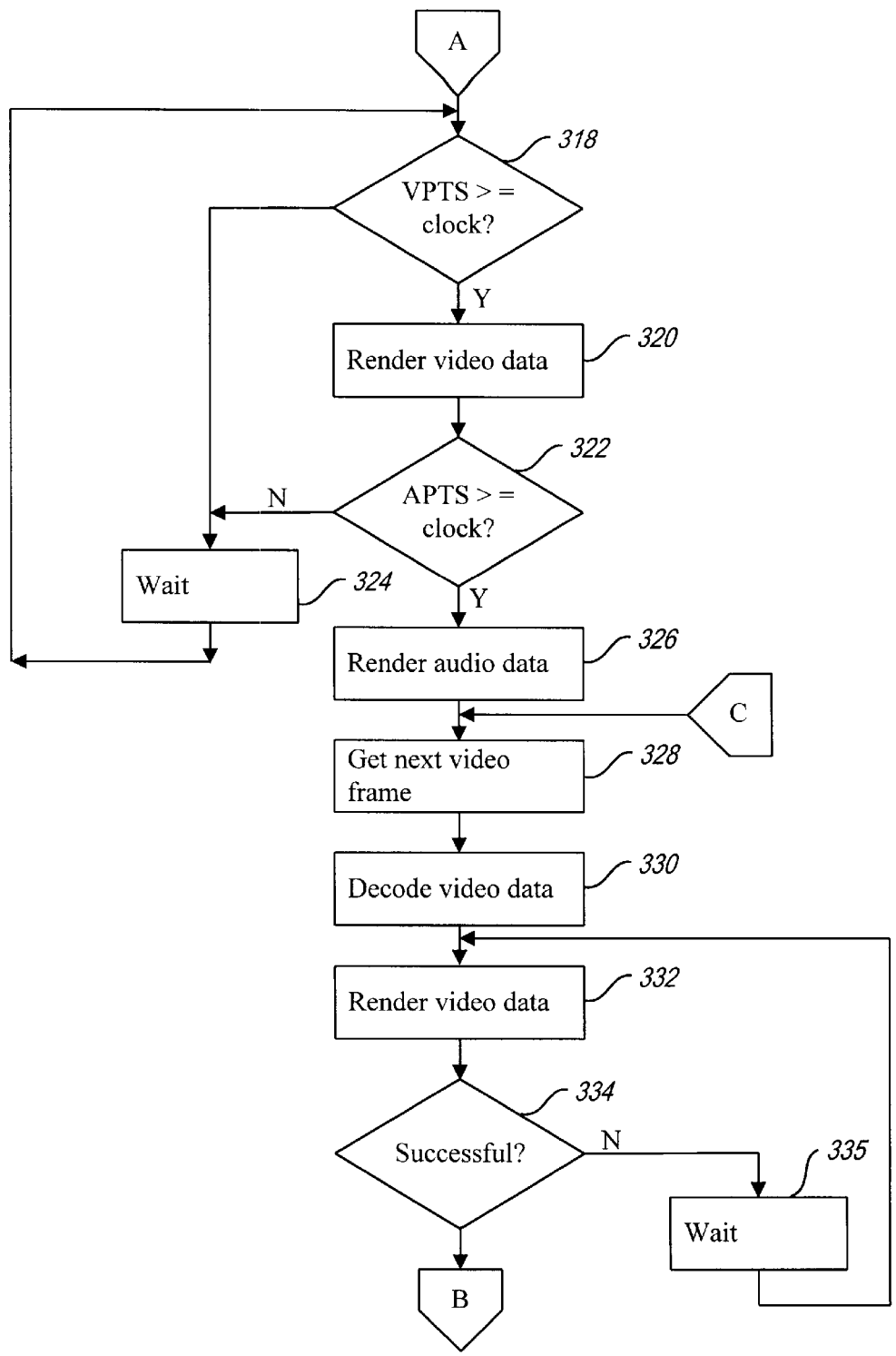
Figure 3C:
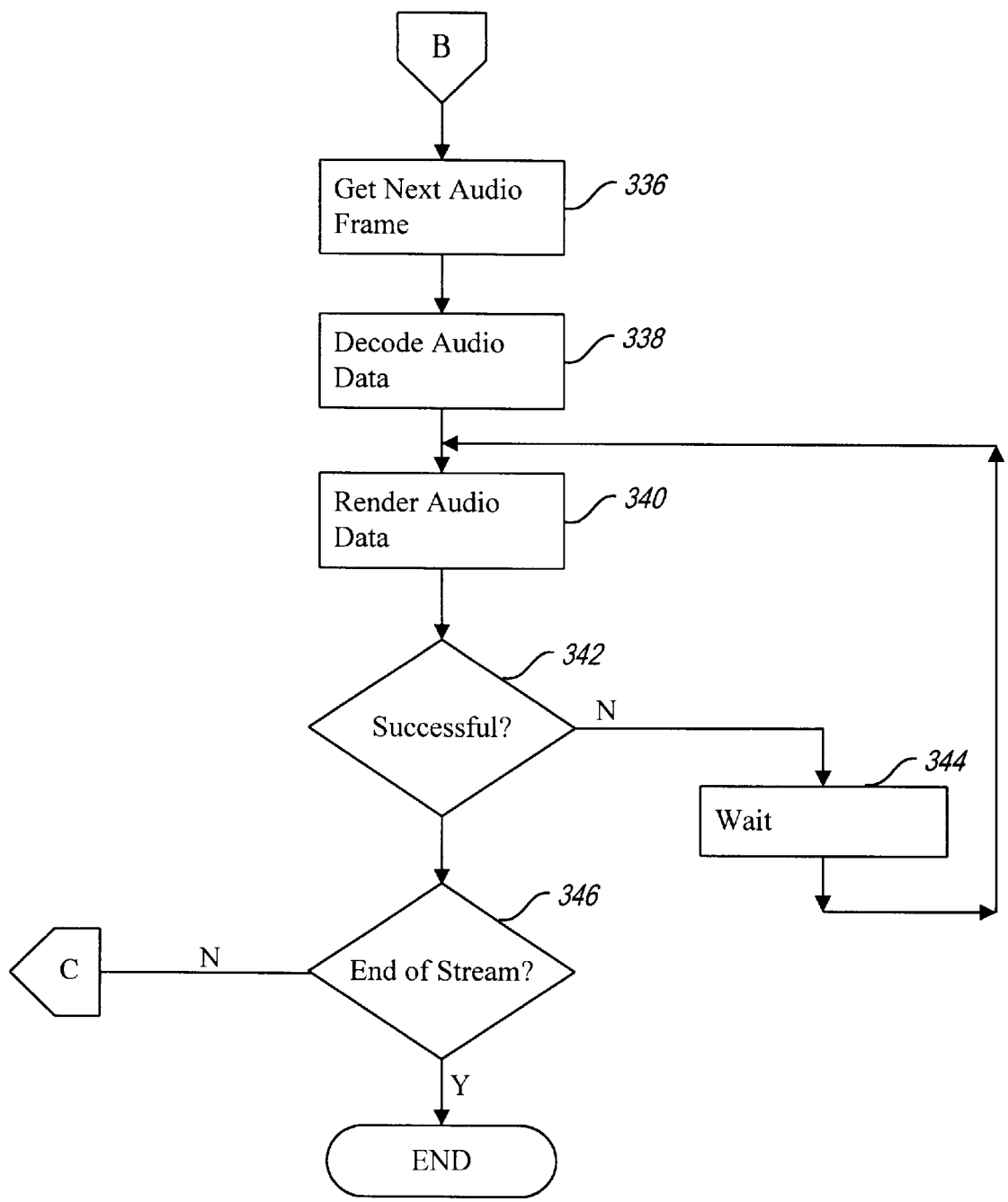

FIGS. 3A, 3B, and 3C depict a flow chart of the steps performed by the DVD player 124. The first step performed by the DVD player is to access the audio-visual stream (step 302). In this step, the DVD player accesses the stream using normal file system calls of the operating system. After accessing the audio-visual stream, the DVD player reads the audio-visual stream to read the SCR of the first frame encountered and the VPTS from the first video frame encountered (step 304). Next, the DVD player adjusts the value of the SCR to synchronize the video start time and the graphics controller so that the video start time will occur at the beginning of a 33.4 millisecond time interval (step 306). This step is discussed in further detail below. After adjusting the SCR, the DVD player stores the adjusted SCR into the external clock (step 308).

After storing the SCR into the external clock, the DVD player decodes the video data by invoking the video decoder (step 312). Then, the DVD player obtains the APTS from the first encountered audio frame (step 314) and decodes the audio data using the audio decoder (step 316). Next, the DVD player determines if it is time to render the video portion by determining whether the VPTS is greater than or equal to the current value of the external clock (step 318 in FIG. 3B). If the VPTS is greater than or equal to the current value, the DVD player renders the video data by sending the decoded video data to the graphics controller (step 320). In this step, the VPTS has been synchronized with the beginning of a 33.4 millisecond time interval, and thus, the video data is ensured to be displayed immediately. If the VPTS is not greater than or equal to the clock, the DVD player waits for a predetermined amount of time, such as 2.5 milliseconds (step 324), and proceeds to step 318. After rendering the video data, the DVD player determines if it is time to render the audio portion by determining if the APTS is greater than or equal to the current value of the external clock (step 322). If the APTS is not greater than or equal to the current value, the DVD player waits for a predetermined amount of time, such as 2.5 milliseconds (step 324), and continues to step 318. However, if the APTS is greater than or equal to the external clock value, the DVD player renders the audio data by sending the decoded audio data to the audio controller (step 326). For reasons of clarity, steps 318–324 have been described as occurring serially. However, one skilled in the art will appreciate that these steps can be executed in parallel.

At this point in the processing, the DVD player has rendered both the first frame of video data and the first frame of audio data and has synchronized the audio-visual stream with the graphics controller. As a result, the audio-visual stream can be played through to completion. The video portion of the audio-visual stream is stored on the DVD CD-ROM in such a manner that the VPTS for each video frame is 33.4 milliseconds apart. That is, the video frames have been stored knowing that they would be displayed on a PC with a graphics controller displaying video frames at 33.4 millisecond intervals. As such, after synchronizing as described above, it can be ensured that the rest of the audio-visual stream will be played in synchronicity with the graphics controller. However, if the audio-visual stream is stopped, synchronization as described above must be performed again. Playing the remainder of the audio-visual stream can be accomplished using a number of methods. One of these methods is now described with respect to steps 328–346, although one skilled in the art will appreciate that other methods can be used.

In rendering the remainder of the audio-visual stream, the DVD player first obtains the next video frame from the audio-visual stream (step 328) and decodes the video data contained in the video frame (step 330). The DVD player then renders the video data by sending the decoded video data to the graphics controller (step 332) and determines if the render operation was successful (step 334). In this step, the graphics controller has a limited amount of DRAM, which can store up to two frames of video data. If this DRAM becomes full, the rendering operation will be unsuccessful. In this situation, the DVD player waits for a predetermined amount of time, such as 20 milliseconds (step 335), proceeds to step 332 and attempts to render the video data again.

However, if the rendering operation is successful the first time it is attempted, the DVD player obtains the next audio frame from the audio-visual stream (step 336 in FIG. 3C) and decodes the audio data (step 338). After decoding the audio data, the DVD player renders the audio data (step 340) and determines if the render operation is successful (step 342). As in the case of the graphics controller, the audio controller contains a limited amount of DRAM, and when the DRAM becomes full, the render operation will fail. In this situation, the DVD player waits for a predetermined amount of time, such as 20 milliseconds (step 344), and processing continues to step 340. If, however, the render operation is successful, the DVD player determines if the end of the audio-visual stream has been reached (step 346). If the end of the stream has not been reached, processing continues to step 328. However, if the end of the stream has been reached, processing ends.

Figure 4:
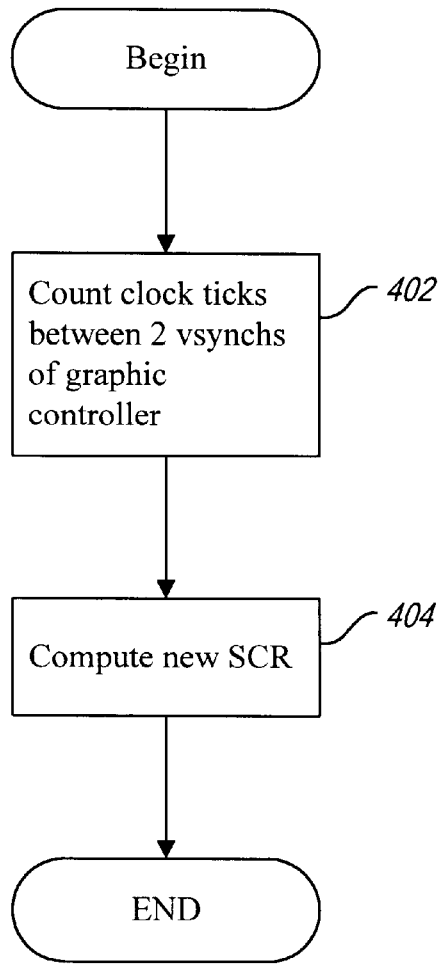
FIG. 4 depicts a flow chart of the steps performed when adjusting the universal system clock reference to synchronize the video start time with the graphics controller.

FIG. 4 depicts a flow chart of the steps performed when adjusting the SCR to synchronize the video start time and the graphics controller. In other words, FIG. 4 is a more detailed diagram of the processing performed in step 306 of FIG. 3A. The first step in performing this synchronization is to count the clock ticks between the two "vsynch" signals of the graphics controller (step 402). As stated above, the graphics controller sends a vsynch signal every 33.4 milliseconds indicating that it is ready to display more video data. Generation of the vsynch signal causes an interrupt to occur that is received by the operating system. The DVD player can receive notification of the vsynch signal by registering with the operating system to receive a notification when the vsynch is generated. In this step, the DVD player counts the number of clock ticks of the external clock that occur between two vsynchs of the graphics controller. After counting the number of clock ticks, the DVD player computes a new SCR, which will then cause the video play time to coincide with a vsynch of the graphics controller (step 404). The new value for the SCR is calculated using the following formula:

NSCR=SCR−((N−(VPTS−SCR))=2SCR-N-VPTS where "NSCR" is the new value for the SCR, and "N" is the number of clock ticks.

After synchronizing the video play time with the vsynch signal of the graphics controller, the DVD player will attempt to display the first video frame at the exact time of a vsynch. Therefore, the audio and video portions of the audio-visual stream will be synchronized to each other, as well as with the graphics controller.

Although the present invention has been described relative to a preferred embodiment thereof, those skilled in the art will know various changes in form and detail that may be made without departing from the spirit and scope of the present invention as defined in the appended claims.

What is claimed is:

1. A method for synchronizing an audio-visual stream with a display device in an audio-visual rendering device having a first clock that synchronizes an audio portion with a video portion of the audio-visual stream and having a second clock that synchronizes the display device with preset time intervals, comprising the steps of:

receiving the audio-visual stream, wherein the audio portion and the video portion are synchronized with the first clock and each have an associated play time;

synchronizing the audio-visual stream with the display device such that the play time of the video portion is synchronized with one of the preset time intervals of the display device, the display device being synchronized to the second clock; and rendering the video portion in synchronization with the preset time interval of the display device.

2. The method of claim 1 wherein the audio-visual rendering device is a personal computer, wherein the personal computer has a DVD CD-ROM drive, and wherein the step of receiving the audio-visual stream includes receiving the audio-visual stream from the DVD CD-ROM drive.

3. A method in an audio-visual rendering device for rendering an audio-visual stream synchronized to a first clock on a video subsystem whose operations are synchronized with respect to a second clock, the video subsystem displaying information at preset time intervals, comprising the steps of:

receiving the audio-visual stream containing a reference clock value, the audio-visual stream having an audio portion and a video portion each with an associated play time indicating a time with respect to the reference clock value for rendering the associated audio portion and the associated video portion;

adjusting the reference clock value such that the play time of the video portion coincides with one of the preset time intervals of the video subsystem;

storing the adjusted reference clock value into the first clock;

displaying on the video subsystem the video portion of the audio-visual stream at the associated play time; and playing on the audio subsystem the audio portion of the audio-visual stream at the associated play time.

4. The method of claim 3 wherein the step of adjusting the reference clock value includes detecting an amount of time between the preset time intervals of the video subsystem to determine an appropriate adjustment to the reference clock value.

5. The method of claim 4 wherein the step of adjusting the reference clock value includes determining the appropriate adjustment by subtracting the associated play time of the video portion from the detected amount of time between the preset time intervals to create a difference value and by subtracting the difference value from a multiple of the reference clock value.

6. The method of claim 5 wherein the multiple of the reference clock value is two.

7. The method of claim 3 wherein the audio-visual rendering device is a personal computer.

8. The method of claim 3 wherein the audio-visual rendering device has a DVD drive and wherein the step of receiving the audio-visual stream includes receiving the audio-visual stream from the DVD drive.

9. The method of claim 3 wherein the audio portion is encoded in accordance with an AC3 compression standard, wherein the audio-visual rendering device has an AC3 decoder, and wherein the step of playing on the audio system the audio portion of the audio-visual stream includes invoking the AC3 decoder to decode the audio portion and playing the decoded audio portion.

10. The method of claim 3 wherein the video portion is encoded in accordance with an MPEG compression standard, wherein the audio-visual rendering device has an MPEG decoder, and wherein the step of displaying on the video subsystem the video portion of the audio-visual stream includes invoking the MPEG decoder to decode the video portion and displaying the decoded video portion.

11. An audio-visual rendering device comprising:

a processor having a first clock;

a second clock;

a DVD drive for generating an audio-visual stream having a play time synchronized to the second clock;

a video subsystem for displaying a video portion of the audio-visual stream at preset time intervals synchronized to the first clock;

a sound subsystem for playing an audio portion of the audio-visual stream; and a memory containing:

a program that receives the audio-visual stream, that synchronizes the play time of the audio-visual stream so that the play time coincides with one of the preset time intervals of the video subsystem, and that renders the audio-visual stream.

12. The audio-visual rendering device of claim 11 wherein the audio-visual rendering device is a personal computer.

13. The audio-visual rendering device of claim 11 wherein the video portion of the audio-visual stream is encoded in accordance with an MPEG standard.

14. The audio-visual rendering device of claim 13, further including a decoder for decoding the video portion before it is displayed on the video subsystem.

15. The audio-visual rendering device of claim 11 wherein the audio portion of the audio-visual stream is encoded in accordance with an AC3 standard.

16. The audio-visual rendering device of claim 15 wherein the audio-visual rendering device includes a decoder for decoding the audio portion before the audio portion is played by the audio subsystem.

17. The audio-visual rendering device of claim 11 wherein the audio portion of the audio-visual stream is encoded in accordance with an MPEG standard.

18. The audio-visual rendering device of claim 11 wherein the audio portion of the audio-visual stream is encoded in accordance with an Linear PCM standard.

19. A computer-readable medium containing instructions for synchronizing an audio-visual stream with a display device in an audio-visual rendering device having a first clock that synchronizes an audio portion with a video portion of the audio-visual stream and having a second clock that synchronizes the display device with preset time intervals, by performing the steps of:

receiving the audio-visual stream, wherein the audio portion and the video portion are synchronized with the first clock and each have an associated play time;

synchronizing the audio-visual stream with the display device such that the play time of the video portion is synchronized with one of the preset time intervals of the display device, the display device being synchronized to the second clock; and rendering the video portion in synchronization with the preset time interval of the display device.

20. The computer-readable medium of claim 19 wherein the audio-visual rendering device is a personal computer, wherein the personal computer has a DVD CD-ROM drive, and wherein the step of receiving the audio-visual stream includes receiving the audio-visual stream from the DVD CD-ROM drive.

21. A computer-readable medium containing instructions for controlling an audio-visual rendering device to render an audio-visual stream synchronized to a first clock on a video subsystem whose operations are synchronized with respect to a second clock, the video subsystem displaying information at preset time intervals, by performing the steps of:

receiving the audio-visual stream containing a reference clock value, the audio-visual stream having an audio portion and a video portion each with an associated play time indicating a time with respect to the reference clock value for rendering the associated audio portion and the associated video portion;

adjusting the reference clock value such that the play time of the video portion coincides with one of the preset time intervals of the video subsystem;

storing the adjusted reference clock value into the first clock:

displaying on the video subsystem the video portion of the audio-visual stream at the associated play time; and playing on the audio subsystem the audio portion of the audio-visual stream at the associated play time.

22. The computer-readable medium of claim 21 wherein the step of adjusting the reference clock value includes detecting an amount of time between the preset time intervals of the video subsystem to determine an appropriate adjustment to the reference clock value.

23. The computer-readable medium of claim 22 wherein the step of adjusting the reference clock value includes determining the appropriate adjustment by subtracting the associated play time of the video portion from the detected amount of time between the preset intervals to create a difference value and by subtracting the difference value from a multiple of the reference clock value.

24. The computer-readable medium of claim 23 wherein the multiple of the reference clock value is two.

25. The computer-readable medium of claim 21 wherein the audio-visual rendering device is a personal computer.

26. The computer-readable medium of claim 21 wherein the audio-visual rendering device has a DVD drive and wherein the step of receiving the audio-visual stream includes receiving the audio-visual stream from the DVD drive.

27. The computer-readable medium of claim 21 wherein the audio portion is encoded in accordance with an AC3 compression standard, wherein the audio-visual rendering device has an AC3 decoder, and wherein the step of playing the audio portion of the audio-visual stream includes invoking the AC3 decoder to decode the audio portion and playing the decoded audio portion.

28. The computer-readable medium of claim 21 wherein the video portion is encoded in accordance with an MPEG compression standard, wherein the audio-visual rendering device has an MPEG decoder, and wherein the step of displaying the video portion of the audio-visual stream includes invoking the MPEG decoder to decode the video portion and displaying the decoded video portion.

* * * * *